(12) United States Patent
Wei et al.

(10) Patent No.: US 12,029,978 B2
(45) Date of Patent: Jul. 9, 2024

(54) METHOD AND APPARATUS FOR DISPLAYING VIRTUAL SCENE, TERMINAL, AND STORAGE MEDIUM

(71) Applicant: TENCENT TECHNOLOGY (SHENZHEN) COMPANY LIMITED, Guangdong (CN)

(72) Inventors: Jia Cheng Wei, Shenzhen (CN); Xun Hu, Shenzhen (CN); Qingchun Lu, Shenzhen (CN); Kang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 292 days.

(21) Appl. No.: 17/518,969

(22) Filed: Nov. 4, 2021

(65) Prior Publication Data

US 2022/0054939 A1 Feb. 24, 2022

Related U.S. Application Data

(63) Continuation of application No. PCT/CN2021/093234, filed on May 12, 2021.

(30) Foreign Application Priority Data

Jun. 5, 2020 (CN) .......................... 202010507621.4

(51) Int. Cl.
*A63F 13/5258* (2014.01)
*A63F 13/42* (2014.01)
*A63F 13/56* (2014.01)

(52) U.S. Cl.
CPC .......... *A63F 13/5258* (2014.09); *A63F 13/42* (2014.09); *A63F 13/56* (2014.09)

(58) Field of Classification Search
CPC ...... A63F 13/5258; A63F 13/56; A63F 13/52; A63F 13/53
See application file for complete search history.

(56) References Cited

U.S. PATENT DOCUMENTS 6,126,545 A * 10/2000 Takahashi ............... A63F 13/10
463/32
9,327,191 B2 5/2016 Miyamoto et al.
(Continued)

FOREIGN PATENT DOCUMENTS

CN 107861682 A 3/2018
CN 108196765 A 6/2018
(Continued)

OTHER PUBLICATIONS

Communication dated Jun. 13, 2022 from the Japanese Patent Office in Japanese Application No. 2021-563354.
(Continued)

*Primary Examiner* — Seng H Lim
(74) *Attorney, Agent, or Firm* — Sughrue Mion, PLLC

(57) ABSTRACT

A method and apparatus for displaying a virtual scene, a terminal, and a storage medium. The method includes displaying a virtual scene image on a terminal screen, the virtual scene image including a controlled virtual object in a virtual scene, controlling, in response to the controlled virtual object being located in a first region in the virtual scene, the controlled virtual object to be displayed at a first position on the terminal screen, and controlling, in response to the controlled virtual object entering a second region in the virtual scene, the controlled virtual object to be displayed at a second position on the terminal screen, the second position being offset relative to the first position.

20 Claims, 11 Drawing Sheets

(56) References Cited

U.S. PATENT DOCUMENTS

| | | | |
|---|---|---|---|
| 9,662,564 B1 | 5/2017 | Hensel et al. | |
| 2012/0309519 A1* | 12/2012 | Hansen | A63F 13/00 463/31 |
| 2014/0306886 A1 | 10/2014 | Hanawa et al. | |
| 2021/0339138 A1 | 11/2021 | Shao et al. | |
| 2021/0362056 A1* | 11/2021 | Zhou | A63F 13/525 |

FOREIGN PATENT DOCUMENTS

| | | | |
|---|---|---|---|
| CN | 109675308 A | 4/2019 | |
| CN | 109675310 A | 4/2019 | |
| CN | 109718548 A | 5/2019 | |
| CN | 111672104 A | 9/2020 | |
| EP | 1 477 935 B1 | 9/2006 | |
| EP | 2 075 041 A1 | 7/2009 | |
| JP | 2000-331184 A | 11/2000 | |
| JP | 2008-99774 A | 5/2008 | |
| JP | 2013-59546 A | 4/2013 | |
| WO | 2018/167319 A1 | 9/2018 | |

OTHER PUBLICATIONS

Communication dated Feb. 24, 2023 from the Singapore Patent Office in Application No. 11202110881Y.
Search Report dated Feb. 24, 2023 issued by the Singapore Patent Office in application No. 11202110881Y.
Written Opinion of the Singapore Patent Office dated Feb. 24, 2023 in Application No. 11202110881Y.
Chinese First Office Action for CN202010507621.4 dated May 26, 2021.
International Search Report for PCT/CN2021/093234 dated Aug. 12, 2021 [PCT/ISA/210].
Written Opinion for PCT/CN2021/093234 dated Aug. 12, 2021 [PCT/ISA/237].
Extended European Search Report dated Jun. 24, 2022 in European Application No. 21787289.4.
Derschmu, "C64 Longplay—Boulder Dash", https://www.youtube.com/watch?v=FiEVfa1OK_o, 2010, first two minutes (2 pages total).
Ian Zamojc, "Unity3D: Third Person Cameras—Tuts+ Code Tutorial", https://web.archive.org/web/20140303200332/https://code.tutsplus.com/tutorials/unity3d-third-person-cameras--mobile=11230, 2012, pp. 1-14 (14 pages total).

* cited by examiner

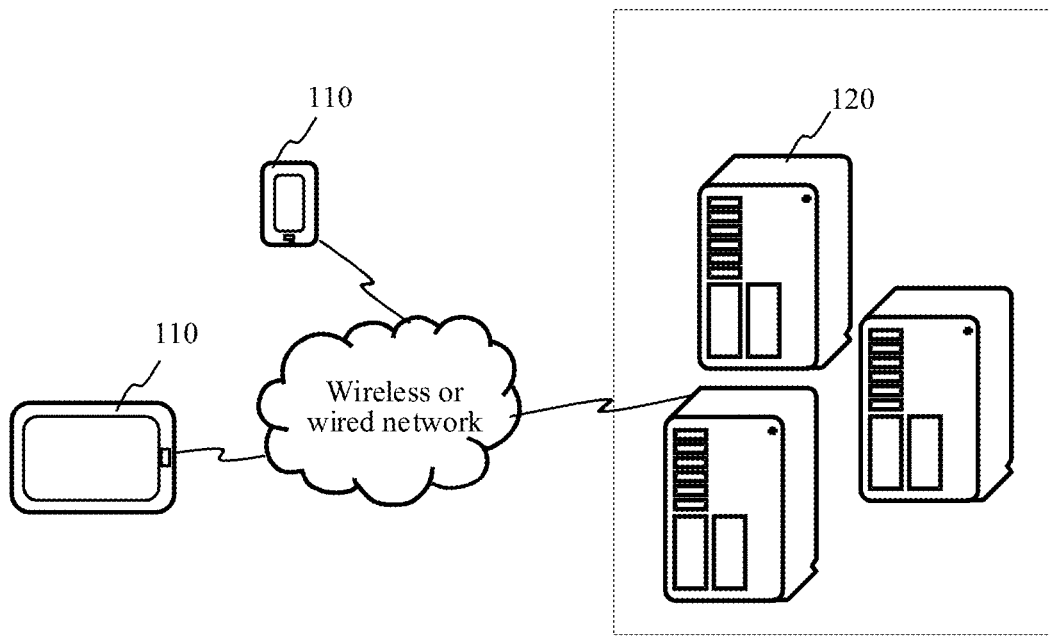

FIG. 1

| Display a virtual scene image on a terminal screen, the virtual scene image including a controlled virtual object in a virtual scene, the controlled virtual object being a virtual object currently controlled by a terminal | 201 |

| The terminal controls, in response to that the controlled virtual object is located in a first region in the virtual scene, the controlled virtual object to be displayed at a first position on the terminal screen | 202 |

| The terminal controls, in response to that the controlled virtual object enters a second region in the virtual scene, the controlled virtual object to be displayed at a second position on the terminal screen, the second position being offset relative to the first position | 203 |

FIG. 2

| | |
|---|---|
| Grid 4478 | 0 |
| Grid 4479 | 0 |
| Grid 4480 | 0 |
| Grid 4481 | 0 |
| Grid 4482 | 0 |
| Grid 4483 | 0 |
| Grid 4484 | 0 |
| Grid 4485 | 0 |
| Grid 4486 | 0 |
| Grid 4487 | 0 |
| Grid 4488 | 0 |
| Grid 4489 | 0 |
| Grid 4490 | 0 |
| Grid 4491 | 0 |
| Grid 4492 | 0 |
| Grid 4493 | 0 |
| Grid 4494 | 7 |
| Grid 4495 | 7 |
| Grid 4496 | 7 |
| Grid 4497 | 7 |
| Grid 4498 | 7 |
| Grid 4499 | 7 |
| Grid 4500 | 7 |
| Grid 4501 | 7 |
| Grid 4502 | 7 |
| Grid 4503 | 7 |
| Grid 4504 | 7 |
| Grid 4505 | 0 |
| Grid 4506 | 0 |
| Grid 4507 | 0 |
| Grid 4508 | 0 |
| Grid 4509 | 0 |
| Grid 4510 | 0 |
| Grid 4511 | 0 |
| Grid 4512 | 0 |
| Grid 4513 | 0 |
| Grid 4514 | 1 |
| Grid 4515 | 1 |
| Grid 4516 | 1 |
| Grid 4517 | 1 |
| Grid 4518 | 1 |
| Grid 4519 | 1 |
| Grid 4520 | 1 |
| Grid 4521 | 1 |
| Grid 4522 | 1 |
| Grid 4523 | 1 |
| Grid 4524 | 1 |
| Grid 4525 | 0 |
| Grid 4526 | 0 |
| Grid 4527 | 0 |
| Grid 4528 | 0 |

FIG. 7

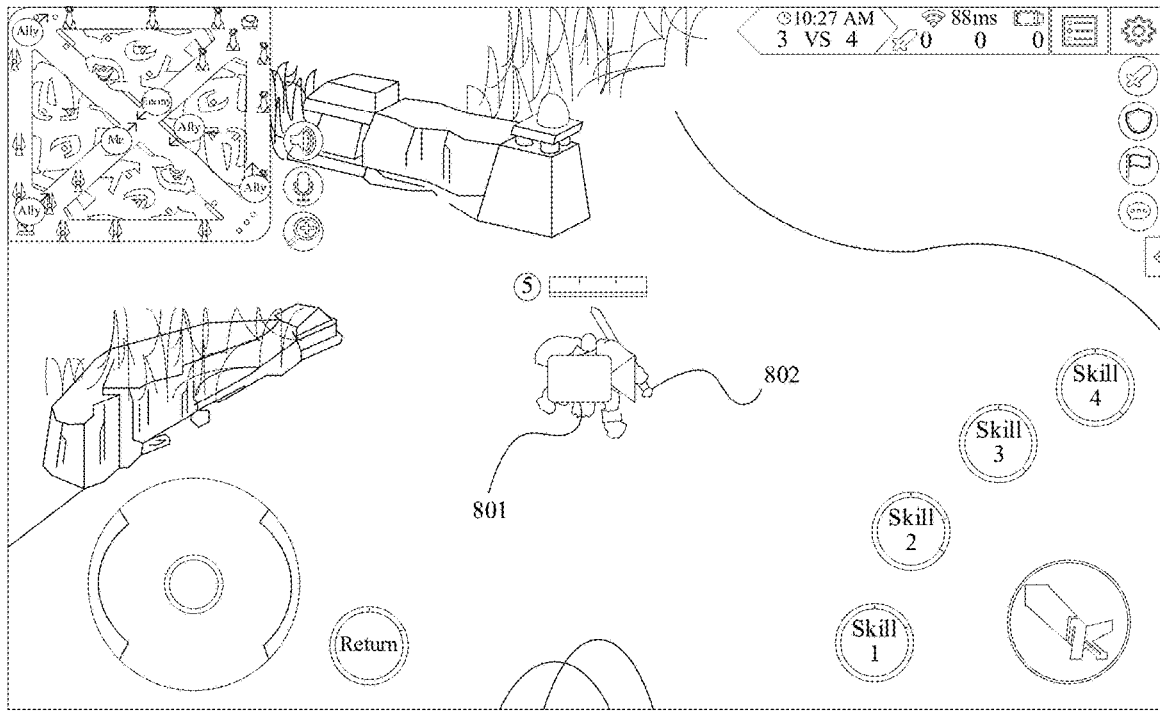
Before movement
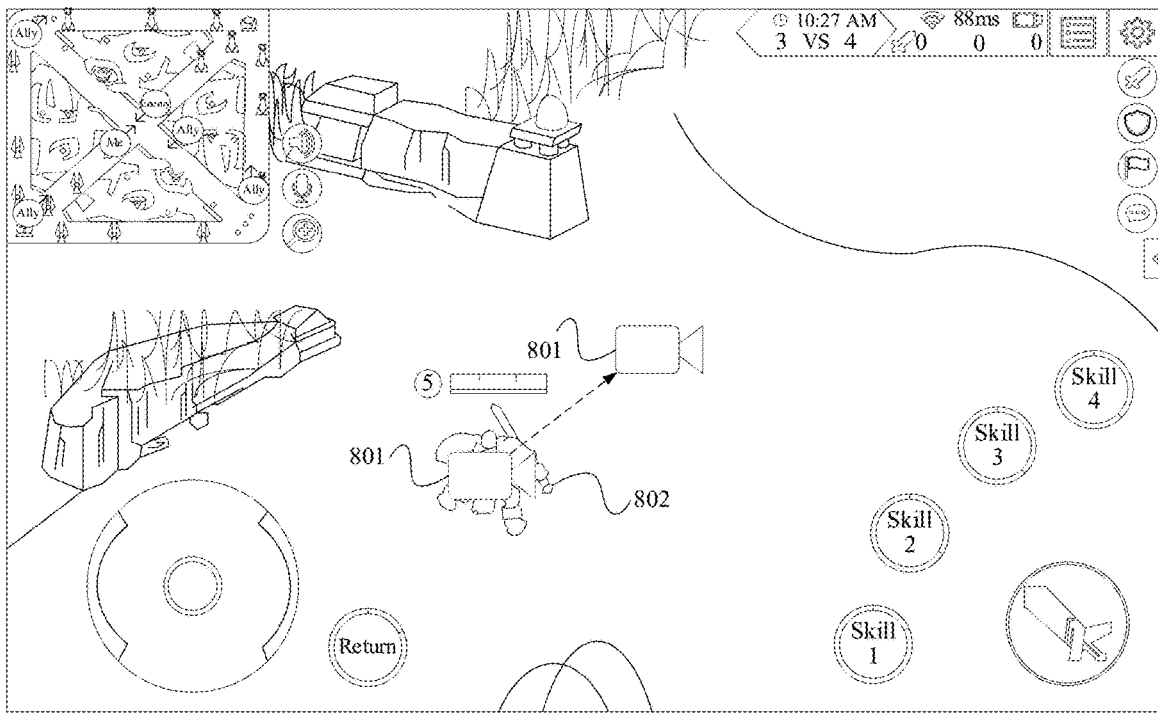
After movement
FIG. 8

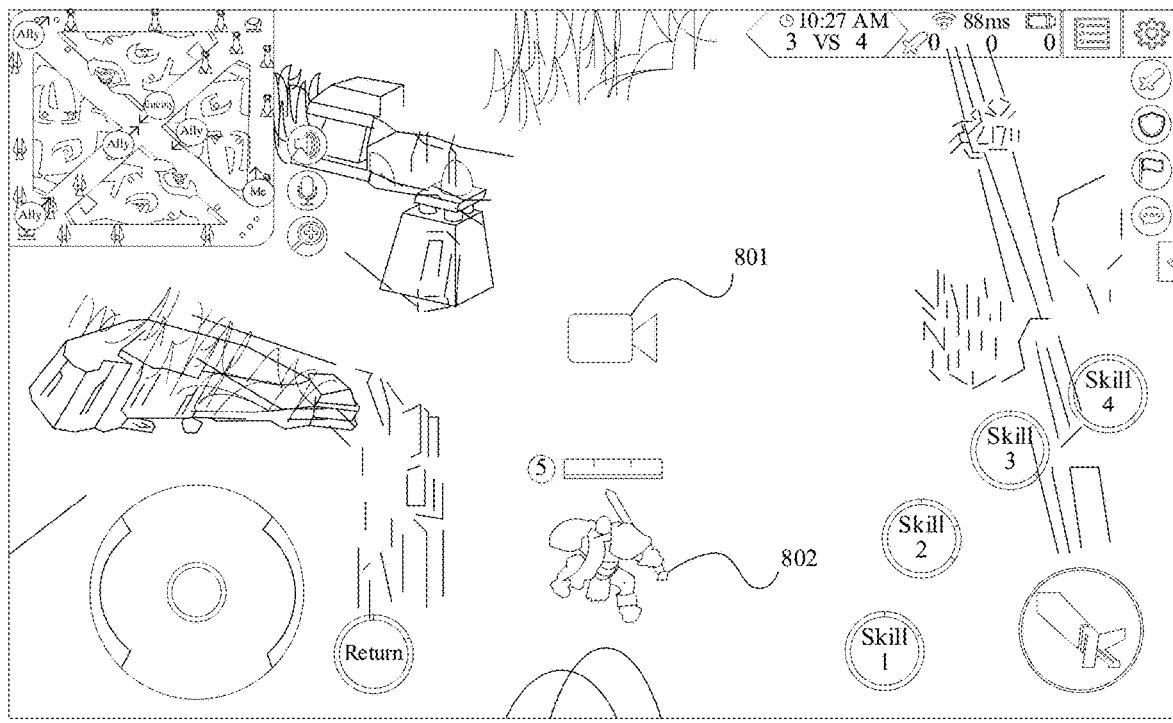
Enable region offset
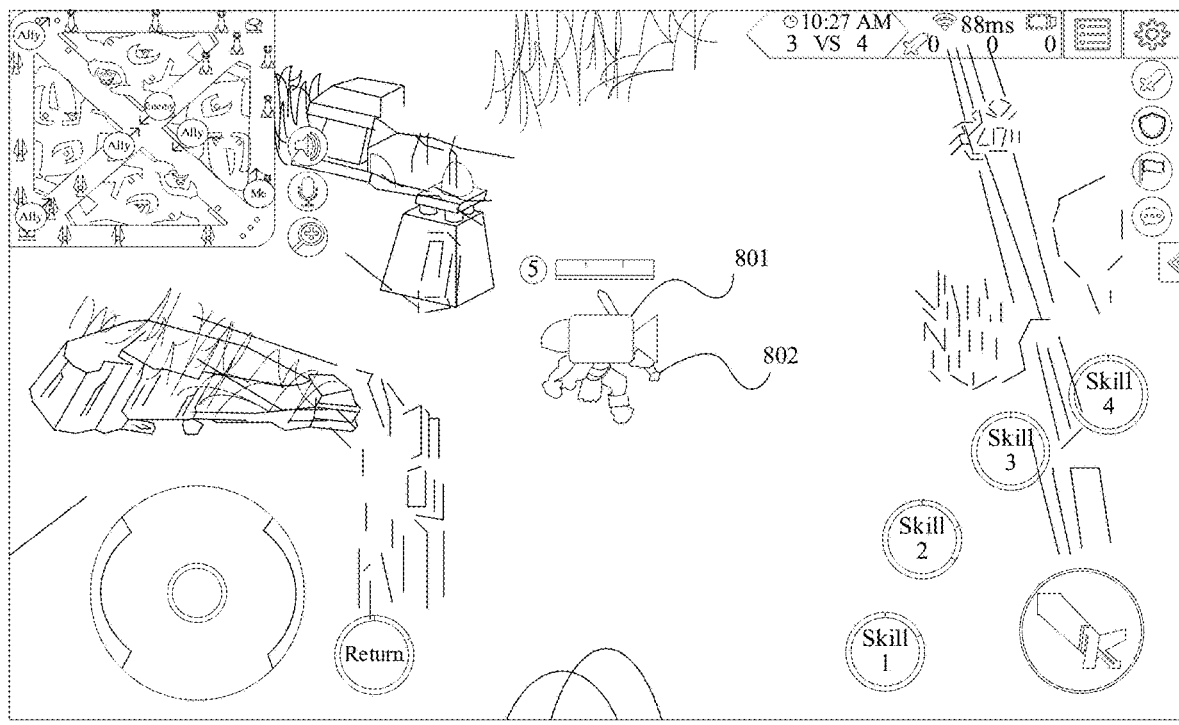
Disable region offset
FIG. 9

METHOD AND APPARATUS FOR DISPLAYING VIRTUAL SCENE, TERMINAL, AND STORAGE MEDIUM

CROSS-REFERENCE TO RELATED APPLICATION(S)

This application is a continuation application of International Application No. PCT/CN2021/093234, filed on May 12, 2021 which claims priority to Chinese Patent Application No. 202010507621.4, filed with the China National Intellectual Property Administration on Jun. 5, 2020, the disclosures of which are incorporated by reference in their entireties.

FIELD

The disclosure relates to the field of computer technologies, and in particular, to a method and apparatus for displaying a virtual scene, a terminal, and a storage medium.

BACKGROUND

With the development of computer technologies and diversification of terminal functions, more mobile games emerge. Multiplayer online battle arena (MOBA) games gradually become a significantly important category of the mobile games. During a game, a terminal may display a virtual scene image of a virtual scene. The virtual scene image includes a virtual object in the virtual scene, and the virtual object may interact with other virtual objects in an adversarial manner.

At present, in a terminal game, a controlled virtual object currently controlled by a terminal user is bound to a lens anchor, that is, the lens anchor moves following movement of the controlled virtual object, so that the controlled virtual object is always at a central position on a terminal screen. However, a problem arisen therefrom is that there is more scene information useless to the terminal user in the virtual scene image displayed by the terminal because the virtual object currently controlled by the terminal is always at the central position on the terminal screen, resulting in low man-machine interaction efficiency, and affecting game experience of the terminal user.

SUMMARY

Embodiments of the disclosure provide a method and apparatus for displaying a virtual scene, a terminal, and a storage medium, to enable a terminal to flexibly adjust a display position of a controlled virtual object on a screen when the controlled virtual object moves between different regions, and display an adjusted virtual scene image on a terminal screen in real time, which improves the function of controlling virtual scene display by the terminal. The technical solutions are as follows:

According to an aspect, an embodiment of the disclosure may provide a method for displaying a virtual scene, performed by a terminal, the method including:
  displaying a virtual scene image on a terminal screen, the virtual scene image including a controlled virtual object in a virtual scene, the controlled virtual object being a virtual object currently controlled by a terminal;
  controlling, in response to the controlled virtual object being located in a first region in the virtual scene, the controlled virtual object to be displayed at a first position on the terminal screen; and
  controlling, in response to the controlled virtual object entering a second region in the virtual scene, the controlled virtual object to be displayed at a second position on the terminal screen, the second position being offset relative to the first position.

According to an aspect, an embodiment of the disclosure may provide an apparatus for displaying a virtual scene, the apparatus including:
  a first display module, configured to display a virtual scene image on a terminal screen, the virtual scene image including a controlled virtual object in a virtual scene, the controlled virtual object being a virtual object currently controlled by a terminal;
  a second display module, configured to control, in response to the controlled virtual object being located in a first region in the virtual scene, the controlled virtual object to be displayed at a first position on the terminal screen; and
  a third display module, configured to control, in response to the controlled virtual object entering a second region in the virtual scene, the controlled virtual object to be displayed at a second position on the terminal screen, the second position being offset relative to the first position.

According to an aspect, an embodiment of the disclosure may provide a terminal, including one or more processors and one or more memories, the one or more memories storing at least one program code, the at least one program code being loaded and executed by the one or more processors to implement the operations performed in the method for displaying a virtual scene according to the foregoing aspect.

According to an aspect, an embodiment of the disclosure may provide a non-volatile computer-readable memory storage medium, storing at least one program code, the at least one program code being loaded and executed by a processor to implement the operations performed in the method for displaying a virtual scene according to any one of the foregoing aspects.

According to an aspect, an embodiment of the disclosure may provide a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the foregoing method for displaying a virtual scene.

BRIEF DESCRIPTION OF THE DRAWINGS

To describe the technical solutions in embodiments of the disclosure more clearly, the following briefly describes the accompanying drawings required for describing the embodiments. The accompanying drawings in the following description show merely some embodiments of the disclosure, and a person of ordinary skill in the art may still derive other accompanying drawings from these accompanying drawings without creative efforts. In addition, one of ordinary skill would understand that aspects of example embodiments may be combined together or implemented alone.

FIG. 1 is a schematic diagram of an implementation environment of a method for displaying a virtual scene according to an embodiment of the disclosure.

FIG. 2 is a flowchart of a method for displaying a virtual scene according to an embodiment of the disclosure.

FIG. 7 is a schematic diagram of a correspondence between partial grids and regions according to an embodiment of the disclosure.

FIG. 8 is a schematic diagram of a moving a virtual camera according to an embodiment of the disclosure.

FIG. 9 is a comparison diagram of enabling region offset and disabling region offset according to an embodiment of the disclosure.

DESCRIPTION OF EMBODIMENTS

Figure 3:
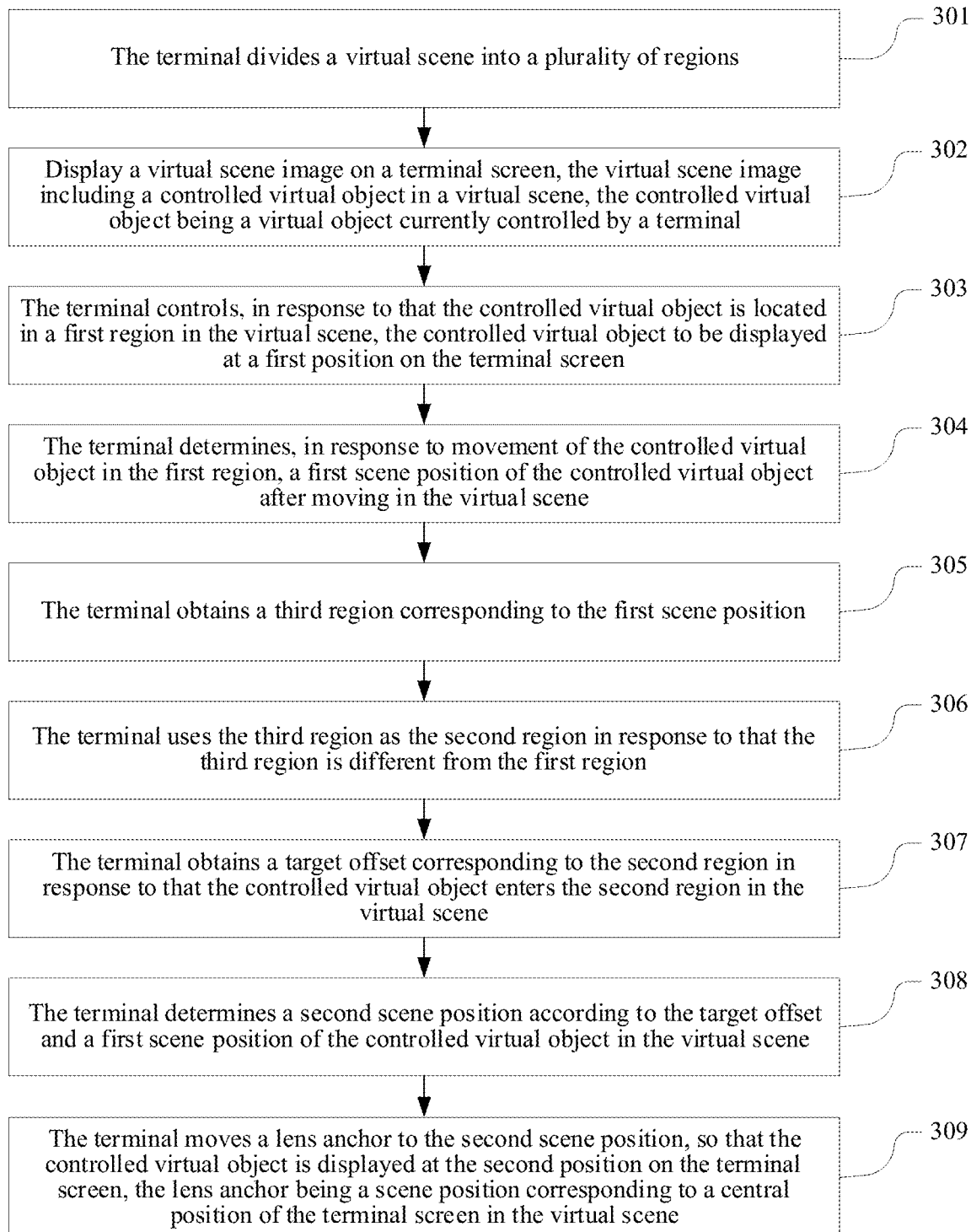
FIG. 3 is a flowchart of a method for displaying a virtual scene according to an embodiment of the disclosure.

To make objectives, technical solutions, and advantages of the disclosure clearer, the following further describes implementations of the disclosure in detail with reference to the accompanying drawings.

The terms "first", "second", and the like in the disclosure are used for distinguishing between same items or similar items of which effects and functions are basically the same. It should be understood that, the "first", "second", and "nth" do not have a dependency relationship in logic or time sequence, and a quantity and an execution order thereof are not limited.

The term "at least one" in the disclosure means one or more and "a plurality of" means two more. For example, a plurality of first positions means two or more first positions.

For convenience of understanding the technical process of embodiments of the disclosure, some terms in the embodiments of the disclosure are described.

Virtual scene: It is a virtual scene displayed (or provided) by an application program when run on a terminal. The virtual scene may be a simulated environment of a real world, or may be a semi-simulated and semi-fictional virtual environment, or may be a completely fictional virtual environment. The virtual scene may be any one of a two-dimensional virtual scene, a 2.5-dimensional virtual scene, and a three-dimensional virtual scene, and the dimension of the virtual scene is not limited in the embodiments of the disclosure. For example, the virtual scene may include the sky, the land, the ocean, or the like. The land may include environmental elements such as the desert and a city. A user may control the virtual object to move in the virtual scene.

In an example embodiment, the virtual scene may further be used for a virtual scene battle between at least two virtual objects, and virtual resources available to the at least two virtual objects are provided in the virtual scene.

In an example embodiment, the virtual scene may include two symmetric regions. Virtual objects on two opposing camps occupy the regions respectively, and an objective of each side is to destroy a target building/fort/base/crystal deep in the region of the opponent to win victory. The symmetrical regions are, for example, a lower left corner region and an upper right corner region, or a left middle region and a right middle region.

Virtual object: It is a movable object in a virtual scene. The movable object may be a virtual character, a virtual animal, a cartoon character, or the like, for example, a character, an animal, a plant, an oil drum, a wall, or a stone displayed in a virtual scene. The controlled virtual object may be a virtual image used for representing the user in the virtual scene. The virtual scene may include a plurality of virtual objects, and each virtual object has a shape and a volume in the virtual scene, and occupies some space in the virtual scene.

In an example embodiment, when the virtual scene is a three-dimensional virtual scene, the virtual object may be a three-dimensional model, and the three-dimensional model may be a three-dimensional character constructed based on a three-dimensional human skeleton technology. The same virtual object may show different external images by wearing different skins. In an example embodiment, the virtual object may be alternatively implemented by using a 2.5-dimensional model or a two-dimensional model. This is not limited in this embodiment of the disclosure.

In an example embodiment, the controlled virtual object may be a player character controlled through an operation on a client, or may be an artificial intelligence (AI) character set in a virtual scene battle through training, or may be a non-player character (NPC) set in virtual scene interaction. The controlled virtual object may be a virtual character competing in the virtual scene. A quantity of virtual objects participating in interaction in the virtual scene may be preset, or may be dynamically determined according to a quantity of clients participating in the interaction.

Multiplayer online battle arena (MOBA) game: It is a game in which several forts are provided in a virtual scene, and users on different camps control virtual objects to battle in the virtual scene, occupy forts or destroy the fort of the opposing camp. For example, in the MOBA game, the users are divided into at least two opposing camps, and different virtual teams on the at least two opposing camps occupy respective map regions and compete against each other by using specific victory conditions as objectives.

The victory conditions include, but not limited to, at least one of occupying forts or destroy forts of the opposing camps, killing virtual objects in the opposing camps, ensuring own survivals in a specified scenario and time, seizing a specific resource, and outscoring the opponent within a specified time. For example, in the MOBA game, the users may be divided into two opposing camps. The virtual objects controlled by the users are scattered in the virtual scene to compete with each other, and the victory condition is to destroy or occupy all enemy forts.

In an example embodiment, each virtual team may include one or more virtual objects, such as one, two, three, or five virtual objects. According to a quantity of virtual objects in each team participating in a battle arena, the battle arena may be divided into 1V1 competition, 2V2 competition, 3V3 competition, 5V5 competition, or the like. 1V1 means "1 to 1", and the details are not described herein.

The MOBA game may take place in rounds. The same map or different maps may be used in different rounds of the battle arena game. A duration of a round of the MOBA game is from a moment at which the game starts to a moment at which the victory condition is met.

In the MOBA game, a user may control a virtual object to fall freely, glide, parachute, or the like in the sky of the virtual scene, or run, jump, crawl, walk in a stooped posture, or the like on the land, or may control a virtual object to swim, float, dive, or the like in the ocean. The scenes are merely used as examples herein, and no specific limitations are set in this embodiment of the disclosure.

In the MOBA games, users may further control the virtual objects to release skills to fight with other virtual objects. For example, the skill types of the skills may include an attack skill, a defense skill, a healing skill, an auxiliary skill, a beheading skill, and the like. Each virtual object may have one or more fixed skills, and different virtual objects generally have different skills, and different skills may produce different effects.

For example, if an attack skill released by a virtual object hits a hostile virtual object, certain damage is caused to the hostile virtual object, which is generally shown as deducting a part of virtual health points of the hostile virtual object. In another example, if a healing skill released by a virtual object hits a friendly virtual object, certain healing is produced for the friendly virtual object, which is generally shown as restoring a part of virtual health points of the friendly virtual object, and all other types of skills may produce corresponding effects. Details are not described herein again.

The following describes a system architecture involved in the disclosure.

FIG. 1 is a schematic diagram of an implementation environment of a method for displaying a virtual scene according to an embodiment of the disclosure. Referring to FIG. 1, the implementation environment includes a terminal 110 and a server 120.

The terminal 110 and the server 120 may be directly or indirectly connected in a wired or wireless communication manner. This is not limited in the disclosure. The terminal 110 may be a smartphone, a tablet computer, a notebook computer, a desktop computer, a smart speaker, a smartwatch, or the like, but is not limited thereto. An application program supporting a virtual scene is installed and run on the terminal 110. The application program may be any one of a massively multiplayer online role playing game (MMORPG), a first-person shooting (FPS) game, a third-person shooting (TPS) game, a virtual reality (VR) application program, a three-dimensional map program, a military simulation program, or a multiplayer shooting survival game.

The terminal 110 may be a terminal used by a user, and the application program running on the terminal 110 logs in to a user account. The user uses the terminal 110 to operate a controlled virtual object in a virtual scene to perform activities. The activities include, but are not limited to, at least one of releasing skills, adjusting body postures, crawling, walking, running, riding, jumping, driving, picking, shooting, attacking, and throwing. For example, the controlled virtual object is a virtual character such as a simulated character role or a cartoon character role.

The server 120 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The server 120 is configured to provide a backend service for an application program supporting a virtual scene.

In an example embodiment, the server 120 may take on primary computing work, and the terminal 110 may take on secondary computing work; alternatively, the server 120 takes on secondary computing work, and the terminal 110 takes on primary computing work; alternatively, the server 120 or the terminal 110 may separately take on a classification work; alternatively, collaborative computing is performed by using a distributed computing architecture between the terminal 110 and the server 120.

In an example embodiment, the server 120 may be formed by an access server, a backend server, and a database server. The access server is configured to provide an access service for the terminal 110. The backend server is configured to provide a backend service for the application program of the virtual scene. There may be one or more backend servers. When there are a plurality of backend servers, at least two backend servers are configured to provide different services, and/or at least two backend servers are configured to provide the same service, for example, provide the same service in a load balancing manner. This is not limited in this embodiment of the disclosure.

The terminal 110 may generally refer to one of a plurality of terminals. In this embodiment, the terminal 110 is merely used as an example for description. The application programs installed on the terminal may be the same, or the application programs installed on two terminals are the same type of application programs in different operating system platforms. A person skilled in the art may learn that there may be more or fewer terminals. For example, there may be only one terminal, or there may be dozens of or hundreds of terminals or more. The quantity and the device type of the terminals are not limited in the embodiments of the disclosure.

In an example embodiment, the controlled virtual object controlled by the terminal 110 and other virtual objects controlled by other terminals are in the same virtual scene. In this case, the controlled virtual object may interact with other virtual objects in an adversarial manner in the virtual scene. The controlled virtual objects and other virtual objects may be in a hostile relationship. For example, the controlled virtual object and other virtual objects may belong to different teams and camps. The virtual objects in the hostile relationship may play against each other by releasing skills. For example, the controlled virtual object releases attack skills to other virtual objects.

In an example embodiment, the controlled virtual object and other virtual objects may alternatively be teammates. For example, a target virtual character and other virtual characters may belong to the same team, the same organization, have a friend relationship, or have temporary communication permissions. In this case, the controlled virtual object may release treatment skills to other virtual objects.

FIG. 2 is a flowchart of a method for displaying a virtual scene according to an example embodiment of the disclosure. In this embodiment of the disclosure, the method being applied to a terminal is used as an example. The terminal may be the terminal 110 shown in FIG. 1, Referring to FIG. 2, the method for displaying a virtual scene includes the following operations:

201: Display a virtual scene image on a terminal screen, the virtual scene image including a controlled virtual object in a virtual scene, the controlled virtual object being a virtual object currently controlled by a terminal.

In this embodiment of the disclosure, the terminal may display the virtual scene image including the controlled virtual object in the virtual scene on the screen, and as the controlled virtual object moves, the virtual scene image displayed on the terminal screen also moves. The virtual scene may be divided into a plurality of regions. The terminal may shoot the virtual scene through a virtual camera, and a virtual scene image captured by the virtual camera is the virtual scene image displayed by the terminal. A lens anchor mapped by the virtual camera in the virtual scene corresponds to a central position of the virtual scene image captured by the virtual camera, that is, corresponds to a central position of the terminal screen. The controlled virtual object may be located at the same position as the lens anchor, or may be located at a different position from the lens anchor.

202: The terminal controls, in response to the controlled virtual object being located in a first region in the virtual scene, the controlled virtual object to be displayed at a first position on the terminal screen.

In this embodiment of the disclosure, the controlled virtual object is located in a different region in the virtual scene, and the position of the controlled virtual object may be the same as or different from the position of the lens anchor, so that the position of the controlled virtual object displayed on the terminal screen may be the same as or different from the central position of the terminal screen.

203: The terminal controls, in response to the controlled virtual object entering a second region in the virtual scene, the controlled virtual object to be displayed at a second position on the terminal screen, the second position being offset relative to the first position.

In this embodiment of the disclosure, after the controlled virtual object enters the second region in the virtual scene, the relative position between the controlled virtual object and the lens anchor changes relative to the first region. Correspondingly, the position of the controlled virtual object displayed on the terminal screen also changes, that is, the second position is offset relative to the first position.

In this embodiment of the disclosure, the virtual scene image including the controlled virtual object in the virtual scene is displayed on the terminal screen, so that the terminal can display the position of the controlled virtual object in the virtual scene to the user in real time. After the controlled virtual object enters the second region from the first region in the virtual scene, the terminal can flexibly adjust the display position of the controlled virtual object on the screen, which is changed from the first position displayed on the terminal screen to the second position displayed on the terminal screen. In addition, the second position is offset relative to the first position, so that the position of the controlled virtual object displayed on the terminal screen is different when located in a different region of the virtual scene, which improves the function of controlling virtual scene display by the terminal. Correspondingly, the content of the virtual scene that the terminal user can observe is also different, so that the terminal user can obtain more scene information, thereby improving the efficiency of man-machine interaction.

FIG. 3 is a flowchart of a method for displaying a virtual scene according to an embodiment of the disclosure. In this embodiment of the disclosure, the method being applied to a terminal is used as an example. The terminal may be the terminal 110 shown in FIG. 1. Referring to FIG. 3, the method for displaying a virtual scene includes the following operations:

301: The terminal divides a virtual scene into a plurality of regions.

In this embodiment of the disclosure, the terminal may divide the virtual scene into a plurality of regions, and different regions correspond to different offsets. The offset is used to indicate an offset direction and an offset distance between the controlled virtual object and the lens anchor. The offset is an offset in a two-dimensional coordinate system, that is, the offset represents the offset direction and the offset distance between the controlled virtual object and the lens anchor in the two-dimensional coordinate system.

The controlled virtual object is a virtual object currently controlled by the terminal. The lens anchor refers to the mapping of the virtual camera in the virtual scene. The virtual camera is configured to shoot the virtual scene. The virtual scene image captured by the virtual camera is the virtual scene image currently displayed by the terminal. The lens anchor corresponds to a central position of the virtual scene image captured by the virtual camera, that is, corresponds to the central position of the terminal screen. The lens anchor has an offset from the controlled virtual object. In different regions, the offset between the controlled virtual object and the lens anchor is different, that is, the lens anchor may be at an upper, upper right, right, upper right and other positions of the controlled virtual object.

The offsets corresponding to different regions are different, and the offset is related to a possible position of an enemy virtual object that does not belong to the same camp and has an adversarial relationship with the controlled virtual object in the region.

A region where the enemy virtual object may appear at any position is set as a default region by the terminal. In the default region, the lens anchor is bound to the controlled virtual object, that is, the lens anchor and the controlled virtual object are at the same position.

A region that is close to our base and where enemy virtual objects mainly appear on the top is set to a region 1 by the terminal, in which the lens anchor is above the controlled virtual object; a region that has substantially the same distance from both bases in the virtual scene and where the enemy virtual object mainly appears on the upper right is set to a region 2 by the terminal, in which the lens anchor is at the upper right of the controlled virtual object; and a region that is close to an enemy base and where the enemy virtual objects mainly appear on the right is set to a region 3 by the terminal, in which the lens anchor is at the right of the controlled virtual object.

A region that connects the enemy base and our base and where the enemy virtual objects mainly appear on the upper right is set to a region 4 by the terminal, in which the lens anchor is at the upper right of the controlled virtual object; a region that is close to our base and where the enemy virtual objects mainly appear on the right is set to a region 5 by the terminal, in which the lens anchor is at the right of the controlled virtual object; a region that has substantially the same distance from both bases in the virtual scene and where the enemy virtual object mainly appears on the upper right is set to a region 6 by the terminal, in which the lens anchor is at the upper right of the controlled virtual object; and a region that is close to the enemy base and where the enemy virtual objects mainly appear on the top is set to a region 7 by the terminal, in which the lens anchor is above the controlled virtual object.

Figure 4:
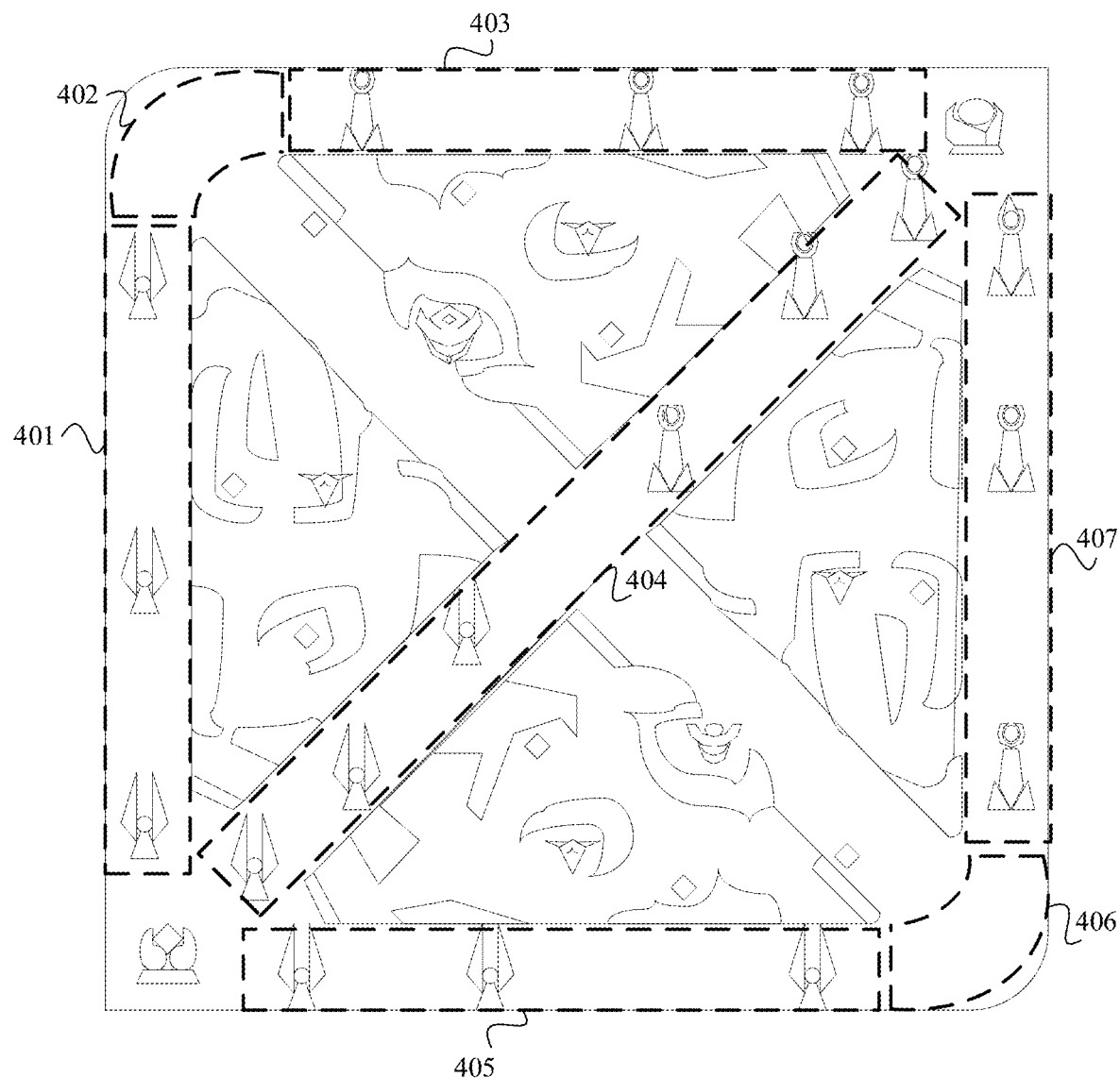
FIG. 4 is a schematic diagram of region division of a virtual scene according to an embodiment of the disclosure.

For example, FIG. 4 is a schematic diagram of region division of a virtual scene according to an embodiment of the disclosure. FIG. 4 includes a region 1 of 401, a region 2 of 402, a region 3 of 403, a region 4 of 404, a region 5 of 405, a region 6 of 406, and a region 7 of 407, and the remaining region of the virtual scene is the default region.

302: Display a virtual scene image on a terminal screen, the virtual scene image including a controlled virtual object in a virtual scene, the controlled virtual object being a virtual object currently controlled by a terminal.

In this embodiment of the disclosure, the terminal may display the virtual scene image captured by the virtual camera on the terminal screen, and the virtual scene image includes the controlled virtual object currently controlled by the terminal.

303: The terminal controls, in response to the controlled virtual object being located in a first region in the virtual scene, the controlled virtual object to be displayed at a first position on the terminal screen.

In this embodiment of the disclosure, the position of the controlled virtual object in the virtual scene is a first scene position, and the central position of the virtual scene image displayed on the terminal screen, that is, the central position of the terminal screen corresponds to the lens anchor. Therefore, if the first scene position of the controlled virtual object is the same as the position of the lens anchor, because the position of the lens anchor also corresponds to the central position of the terminal screen, the controlled virtual object is displayed at the central position of the terminal screen. If the first scene position of the controlled virtual object is different from the position of the lens anchor, the controlled virtual object is displayed in a non-central position of the terminal screen.

Because the offsets corresponding to different regions in the virtual scene are different, that is, the offset direction and the offset distance between the lens anchor and the controlled virtual object are different, the position of the controlled virtual object displayed on the terminal screen is also different. The region in the virtual scene where the controlled virtual object is currently located is referred to as the first region, and the corresponding terminal may determine the position of the lens anchor relative to the virtual object according to the offset corresponding to the first region. The virtual camera is moved according to the position of the lens anchor, thereby transforming the virtual scene image displayed on the terminal screen, and controlling the controlled virtual object to be displayed at the first position on the terminal screen.

304: The terminal determines, in response to a movement operation of the controlled virtual object in the first region, a first scene position of the controlled virtual object after moving in the virtual scene.

In this embodiment of the disclosure, the terminal may control the controlled virtual object to move in the virtual scene, and the terminal may determine the first scene position of the controlled virtual object after moving in the virtual scene by obtaining position information of the controlled virtual object. The first scene position may be coordinates of the controlled virtual object in the virtual scene.

305: The terminal obtains a third region corresponding to the first scene position.

In this embodiment of the disclosure, the terminal may determine the third region corresponding to the first scene position by calculation according to the first scene position where the controlled virtual object is currently located, that is, the region where the controlled virtual object is located after moving in the virtual scene. The terminal may further divide the virtual scene into a plurality of grids, and one region in the virtual scene corresponds to at least one grid. A correspondence between a grid identifier of a grid and a region identifier of a region is established, so that the terminal may determine the region where the controlled virtual object is located after moving in the virtual scene according to a grid corresponding to the first scene position of the controlled virtual object after moving.

In an example embodiment, the step for the terminal to determine the region where the controlled virtual object is located after moving in the virtual scene according to the grid may be as follows: the terminal may determine, according to the first scene position, a target grid where the first scene position is located, the target grid being any grid of a plurality of grids corresponding to the virtual scene. The terminal may obtain a region corresponding to the target grid as the third region corresponding to the first scene position according to a correspondence between a grid identifier and a region identifier.

Because the grid is used to determine the region where the controlled virtual object is located after moving in the virtual scene, problems of a large calculation amount and a long time caused during determining of whether the controlled virtual object is in an irregular region through calculation according to the first scene position of the controlled virtual object are avoided. The region can be quickly determined according to the correspondence between the grid identifier and the region identifier, and the calculation amount is small and the efficiency is high.

Figure 5:
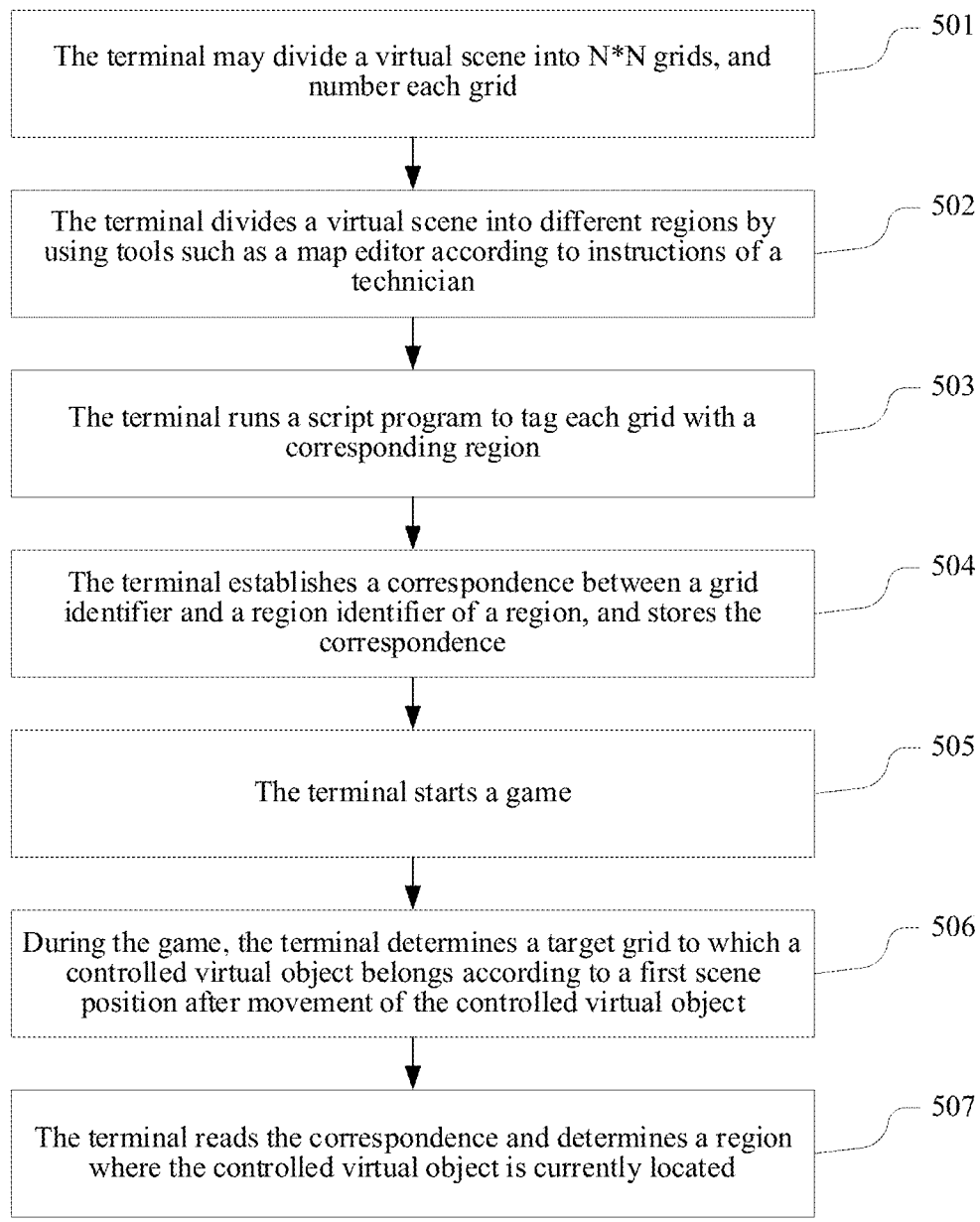
FIG. 5 is a schematic diagram of determining a region in which a controlled virtual object is currently located according to an embodiment of the disclosure.

For example, FIG. 5 is a schematic diagram of determining a region in which a controlled virtual object is located after moving in a virtual scene according to an embodiment of the disclosure. The method being applied to a terminal is used as an example. The terminal may be the terminal 110 shown in FIG. 1. As shown in FIG. 5, the following operations are included:

501. The terminal may divide a virtual scene into N*N grids, and number each grid.

502. In response to a user operation, the terminal divides the virtual scene into different regions by using a map editing tool. For example, the terminal uses a map editor for division according to instructions from a technician.

503. The terminal runs a script program to tag each grid with a corresponding region.

504. The terminal establishes a correspondence between a grid identifier and a region identifier of a region, and stores the correspondence.

505. The terminal starts a game.

506. During the game, the terminal determines a target grid to which a controlled virtual object belongs according to a first scene position after movement of the controlled virtual object.

507. The terminal reads the correspondence and determines a region where the controlled virtual object is currently located.

Figure 6:
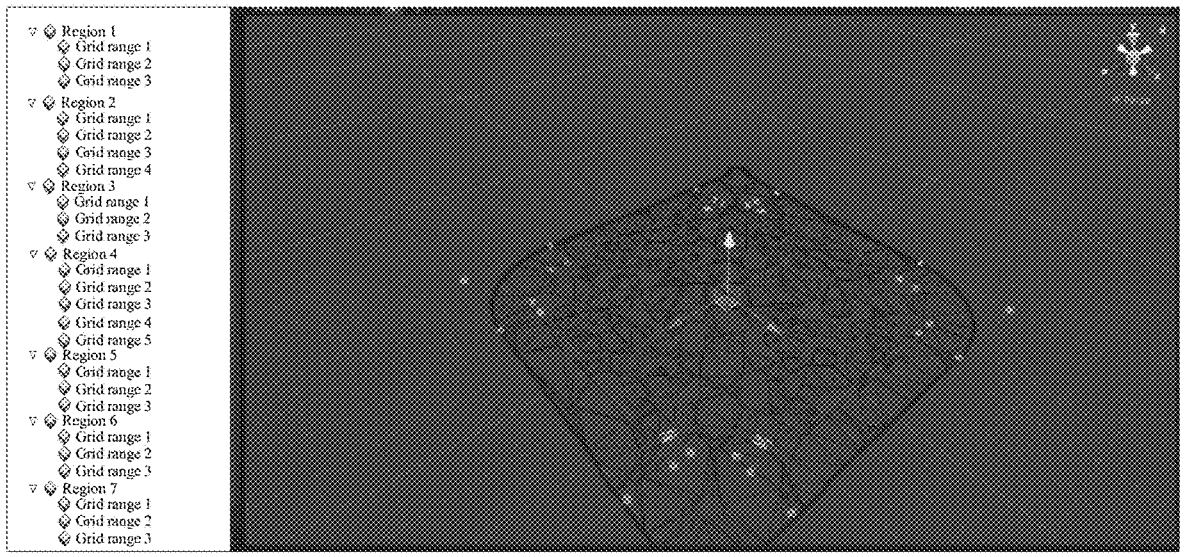
FIG. 6 is a schematic diagram of a map editor according to an embodiment of the disclosure

FIG. 6 is a schematic exemplary diagram of a map editor. As shown in FIG. 6, a two-dimensional plane view of a game scene is drawn in an N*N grid. The two-dimensional plane view of the game scene is divided into different regions, such as a region 1, a region 2, a region 3, a region 4, a region 5, a region 6, and a region 7 shown on the left side of FIG. 6. Each region corresponds to a grid range corresponding to the region, that is, at least one grid corresponding to the region.

FIG. 7 schematically shows a correspondence between partial grids and regions. Each grid corresponds to one region, and one region corresponds to a plurality of grids.

306: The terminal uses the third region as the second region in response to the third region being different from the first region.

In this embodiment of the disclosure, if the third region and the first region are not the same region, it indicates that the controlled virtual object moves from the first region to another region, and the region where the controlled virtual object enters is referred to as the second region.

307: The terminal obtains a target offset corresponding to the second region in response to the controlled virtual object entering the second region in the virtual scene.

In this embodiment of the disclosure, the offset between the controlled virtual object and the lens anchor in different regions of the virtual scene may be the same or different. When the controlled virtual object enters the second region, the terminal may obtain the target offset between the controlled virtual object and the lens anchor in the second region.

For example, the first region is the region 1, and the second region is the region 2. In the region 1, the lens anchor is located at the upper position relative to the controlled virtual object, that is, offset upward; and in the region 2, the lens anchor is located at the upper right position relative to the controlled virtual object, that is, offset to the upper right. In another example, the first region is the region 5, and the second region is the region 6. In the region 5, the lens anchor is located at the right position relative to the controlled virtual object, that is, offset to the right; and in the region 6, the lens anchor is located at the upper right position relative to the controlled virtual object, that is, offset to the upper right. The terminal may obtain offsets corresponding to different regions.

308: The terminal determines a second scene position according to the target offset and a first scene position of the controlled virtual object in the virtual scene.

In this embodiment of the disclosure, after the controlled virtual object enters the second region, because the offset between the lens anchor and the controlled virtual object in the first region is different from the offset between the lens anchor and the controlled virtual object in the second region, the terminal needs to determine the second scene position where the lens anchor is located when the controlled virtual object enters the second region, that is, the scene position to which the lens anchor needs to be adjusted, so that the relative position between the lens anchor and the controlled virtual object conforms to the target offset corresponding to the second region. The terminal may obtain the first scene position where the controlled virtual object is currently located, and determine, according to the target offset corresponding to the second region, the second scene position of the lens anchor in the second region relative to the controlled virtual object.

In an example embodiment, the relative position between the lens anchor and the controlled virtual object may be represented by using a target offset in a form of two-dimensional coordinates. Correspondingly, the step for the terminal to determine a second scene position according to the target offset and a first scene position of the controlled virtual object in the virtual scene may be as follows: The terminal may obtain a sum of the target offset and the first scene position of the controlled virtual object in the virtual scene, and use the sum as the second scene position. The target offset in the form of two-dimensional coordinates is used to indicate the relative position between the controlled virtual object and the lens anchor, to quickly determine, according to the position of the controlled virtual object, the scene position to which the lens anchor is to move.

For example, a target offset corresponding to a target region is (10, 20), which indicates that the offset is 10 to an x direction and 20 to a y direction. The current first scene position of the controlled virtual object is (10, 259). It indicates that lens anchor is at the upper right of the controlled virtual object, that is, a target position of the lens anchor is (20, 279).

After the controlled virtual object enters the second region from the first region, the controlled virtual object is not still, but moves in the second region. Because the relative position between the lens anchor and the controlled virtual object, that is, the target offset, remains unchanged in the second region, as a real-time position of the controlled virtual object changes, the second scene position of the lens anchor also changes correspondingly, and the terminal may update the second scene position in real time.

Correspondingly, the step for the terminal to update the second scene position may be as follows: the terminal may obtain, in response to a movement operation of the controlled virtual object in the target region, a third scene position where the controlled virtual object is located after moving. The terminal may update the second scene position of the lens anchor according to the target offset and the third scene position, so that the controlled virtual object is always displayed at the second position of the terminal screen. The second scene position of the lens anchor is updated in real time, so that the relative position between the central position of the terminal screen corresponding to the lens anchor and the second position of the controlled virtual object displayed on the terminal screen remains unchanged in the second region.

309: The terminal moves a lens anchor to the second scene position, so that the controlled virtual object is displayed at the second position on the terminal screen, the lens anchor being a scene position corresponding to a central position of the terminal screen in the virtual scene.

In this embodiment of the disclosure, after obtaining the second scene position of the lens anchor, the terminal may move the lens anchor to the second scene position by moving the virtual camera, so that the virtual object is displayed at the second position of the terminal screen. The terminal may move the virtual camera quickly, or move the virtual camera slowly at a uniform speed.

In an example embodiment, the user may set a movement mode and a movement speed when moving the virtual camera by setting movement configuration information. Correspondingly, the step for the terminal to move the lens anchor to the second scene position may be as follows: The terminal may obtain movement configuration information, the movement configuration information being used for indicating a movement mode and a movement speed of moving the virtual camera. The terminal may move, according to the movement mode and the movement speed indicated by the movement configuration information, the lens anchor to the second scene position.

The movement mode may be uniform movement, accelerated movement, decelerated movement, or the like. The movement speed may be high-speed movement, medium-speed movement, low-speed movement, or the like. The lens anchor of the virtual camera is moved by using the movement configuration information, so that a movement process of the lens anchor of the virtual camera is relatively smooth, and captured virtual scene images are more consistent, thereby ensuring the user experience.

For example, the terminal determines, according to the movement configuration information, that the movement mode of moving the virtual camera is uniform movement and the movement speed is slow. The terminal moves the lens anchor of the virtual camera slowly at a uniform speed, to move the lens anchor to the second scene position. The terminal may display the virtual scene image captured by the virtual camera in real time in the process of moving the lens anchor of the virtual camera. Correspondingly, with the movement of the lens anchor, the central position of the terminal screen and the displayed position of the controlled virtual object change until the controlled virtual object is located at the second position of the terminal screen.

FIG. 8 is a schematic diagram of a moving a virtual camera according to an embodiment of the disclosure. As shown in FIG. 8, before a virtual camera is moved, a central position of a virtual scene image captured by the virtual camera, that is, a lens anchor 801, is the same scene position as a controlled virtual object 802. After the lens anchor of the virtual camera is moved, a scene position corresponding to a central position of a terminal screen in the virtual scene, that is, the lens anchor 801, is at the upper right of the controlled virtual object 802.

The terminal may provide options for enabling region offset and disabling region offset in a game interface. When the terminal detects that the option of enabling region offset is activated, the operations described in operation 302 to operation 309 above may be performed, to move the lens anchor of the virtual camera according to the region where the controlled virtual object is located, so that the central position of the terminal screen is different from the position of the controlled virtual object on the terminal screen; and when the terminal detects that the option of disabling the region offset is activated, the terminal may set the second scene position of the lens anchor to the first scene position where the controlled virtual object is located, that is, the position of the controlled virtual object displayed on the terminal screen is the same as the central position of the terminal screen.

For example, FIG. 9 is a comparison diagram of enabling region offset and disabling region offset according to an embodiment of the disclosure. As shown in FIG. 9, according to a target offset corresponding to the region where the controlled virtual object 802 is located, it may be learned that the lens anchor is above the controlled virtual object in the map region. When the region offset is enabled, the scene position corresponding to the central position of the terminal screen in the virtual scene, that is, the lens anchor 801, is above the controlled virtual object 802. When the region offset is disabled, the scene position corresponding to the central position of the terminal screen in the virtual scene, that is, the lens anchor 801, is the same position as the controlled virtual object 802.

Figure 10:
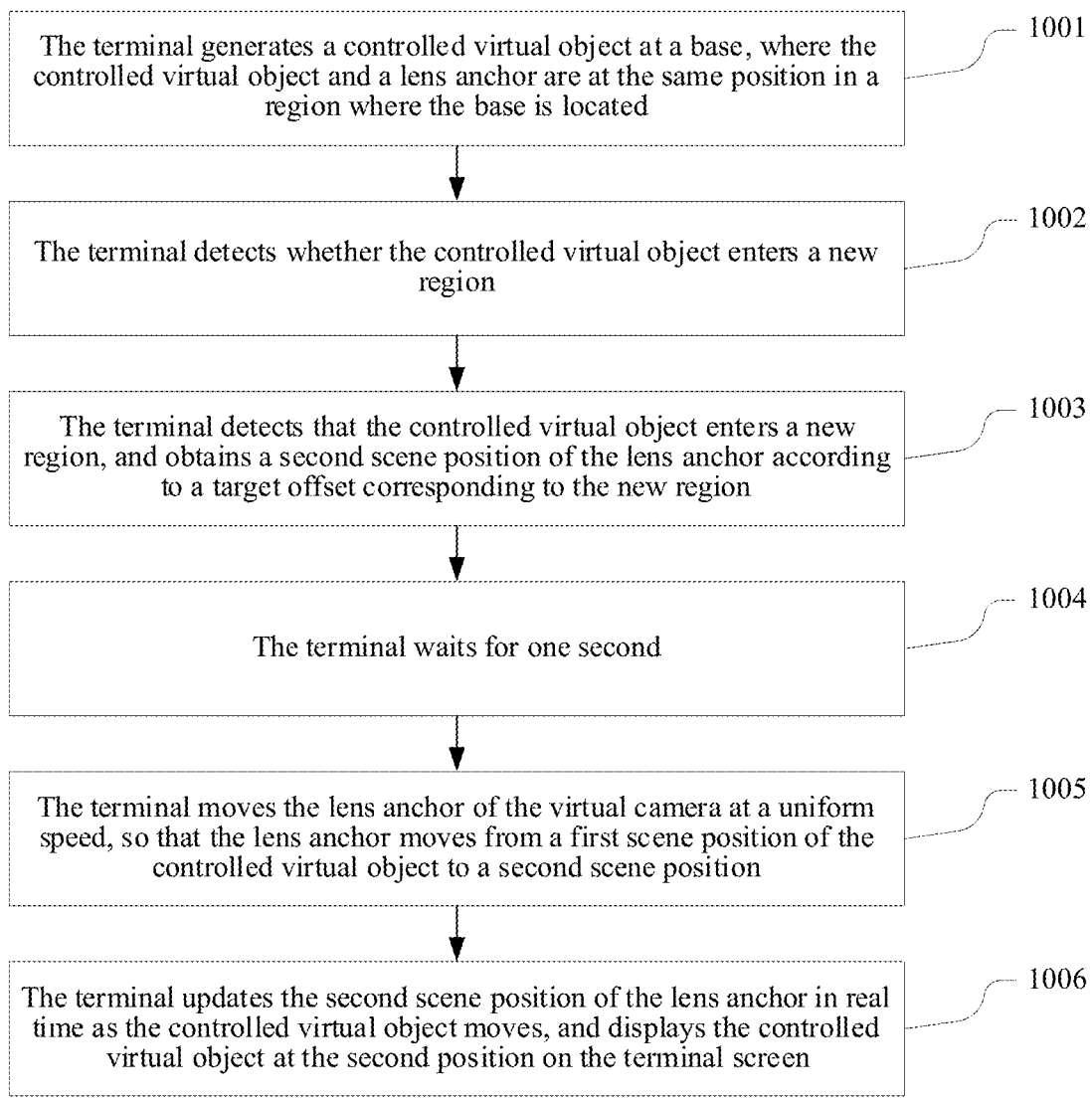
FIG. 10 is a schematic flowchart of another method for displaying a virtual scene according to an embodiment of the disclosure.

The foregoing operations 301 to 307 are examples of the method for displaying a virtual scene provided in the embodiments of the disclosure. Correspondingly, there are other embodiments, for example, as shown in FIG. 10. FIG. 10 is a schematic flowchart of another method for displaying a virtual scene according to an embodiment of the disclosure. The method being applied to a terminal is used as an example. The terminal may be the terminal 110 shown in FIG. 1. As shown in FIG. 10, the following operations are included:

1001. The terminal generates a controlled virtual object at a base, where the controlled virtual object and a lens anchor are at the same position in a region where the base is located.

1002. The terminal detects whether the controlled virtual object enters a new region.

1003. The terminal detects that the controlled virtual object enters a new region, and obtains a second scene position of the lens anchor according to a target offset corresponding to the new region.

1004. The terminal waits for N seconds, and for example, N is 1.

1005. The terminal moves the lens anchor of the virtual camera at a uniform speed, so that the lens anchor moves from a first scene position of the controlled virtual object to a second scene position.

1006. The terminal updates the second scene position of the lens anchor in real time as the controlled virtual object moves, and displays the controlled virtual object at the second position on the terminal screen.

In this embodiment of the disclosure, the virtual scene image including the controlled virtual object in the virtual scene is displayed on the terminal screen, so that the terminal user can learn the position of the controlled virtual object in the virtual scene. After the controlled virtual object enters the second region from the first region in the virtual scene, the controlled virtual object displayed on the terminal screen is changed from the first position displayed on the terminal screen to the second position displayed on the terminal screen. In addition, the second position is offset relative to the first position, so that the position of the controlled virtual object displayed on the terminal screen is different when located in a different region of the virtual scene. Correspondingly, the content of the virtual scene that the terminal user can observe is also different, so that the terminal user can obtain more scene information, thereby improving the efficiency of man-machine interaction.

Figure 11:
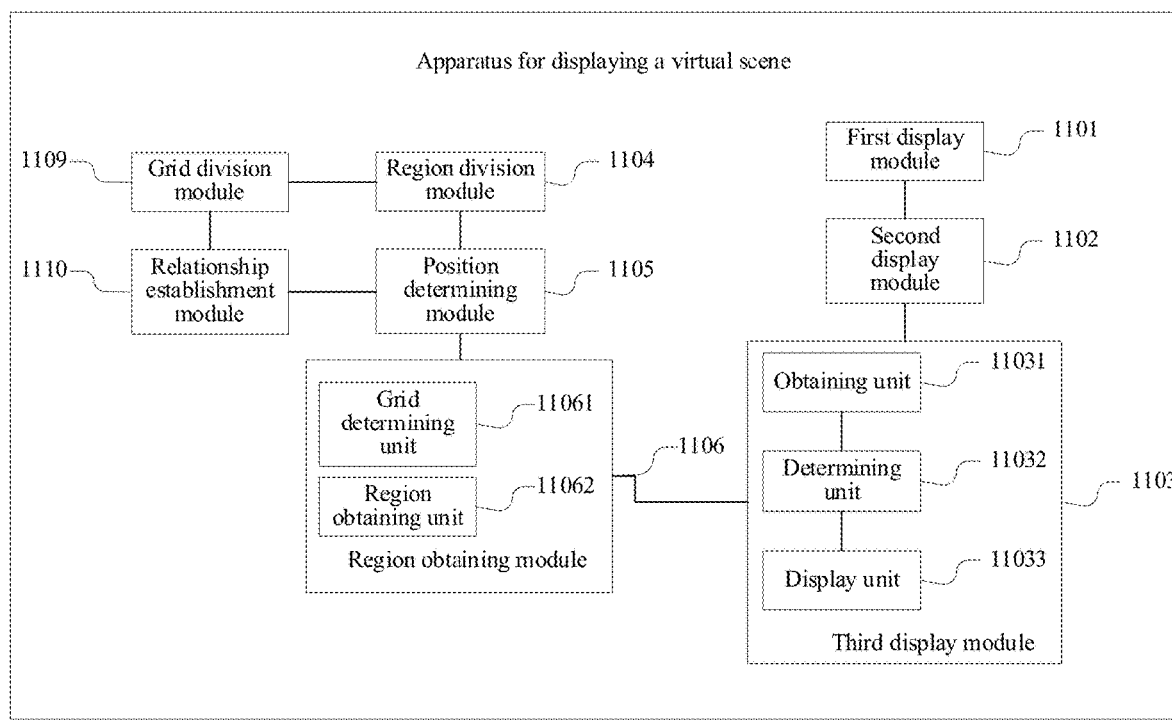
FIG. 11 is a schematic structural diagram of an apparatus for displaying a virtual scene according to an embodiment of the disclosure.

FIG. 11 is a schematic structural diagram of an apparatus for displaying a virtual scene according to an embodiment of the disclosure. Referring to FIG. 11, the apparatus includes: a first display module 1101, a second display module 1102, and a third display module 1103.

The first display module 1101 is configured to display a virtual scene image on a terminal screen, the virtual scene image including a controlled virtual object in a virtual scene, the controlled virtual object being a virtual object currently controlled by a terminal;

the second display module 1102 is configured to control, in response to the controlled virtual object being located in a first region in the virtual scene, the controlled virtual object to be displayed at a first position on the terminal screen; and the third display module 1103 is configured to control, in response to the controlled virtual object entering a second region in the virtual scene, the controlled virtual object to be displayed at a second position on the terminal screen, the second position being offset relative to the first position.

In an example embodiment, the third display module 1103 includes:

an obtaining unit 11031, configured to obtain a target offset corresponding to the second region in response to the controlled virtual object entering the second region in the virtual scene;

a determining unit 11032, configured to determine a second scene position according to the target offset and a first scene position of the controlled virtual object in the virtual scene; and a display unit 11033, configured to control a lens anchor to move to the second scene position, so that the controlled virtual object is displayed at the second position on the terminal screen, the lens anchor being a scene position corresponding to a central position of the terminal screen in the virtual scene.

In an example embodiment, the determining unit 11032 is configured to obtain a sum of the target offset and the first scene position of the controlled virtual object in the virtual scene, and use the sum as the second scene position.

In an example embodiment, the display unit 11033 is configured to obtain movement configuration information, the movement configuration information being used for indicating a movement mode and a movement speed of moving the virtual scene image; and control, according to the movement mode and the movement speed indicated by the movement configuration information, the lens anchor to move to the second scene position.

In an example embodiment, the apparatus further includes:
- a region division module 1104, configured to divide the virtual scene into a plurality of regions;
- a position determining module 1105, configured to determine, in response to a movement operation of the controlled virtual object in the first region, a first scene position of the controlled virtual object after moving in the virtual scene; and
- a region obtaining module 1106, configured to obtain a third region corresponding to the first scene position, and
- the region obtaining module 1106 being further configured to use the third region as the second region in response to the third region being different from the first region.

In an example embodiment, the region obtaining module 1106 includes:
- a grid determining unit 11061, configured to determine, according to the first scene position, a target grid where the first scene position is located, the target grid being any grid of a plurality of grids corresponding to the virtual scene; and
- a region obtaining unit 11062, configured to obtain a region corresponding to the target grid as the third region according to a correspondence between a grid identifier and a region identifier.

In an example embodiment, the apparatus further includes:
- a grid division module 1107, configured to divide the virtual scene into a plurality of grids, one region of the virtual scene being corresponding to at least one grid; and
- relationship establishment module 1108, configured to establish a correspondence between a grid identifier of a grid and a region identifier of a region.

In this embodiment of the disclosure, the virtual scene image including the controlled virtual object in the virtual scene is displayed on the terminal screen, so that the terminal user can learn the position of the controlled virtual object in the virtual scene. After the controlled virtual object enters the second region from the first region in the virtual scene, the controlled virtual object displayed on the terminal screen is changed from the first position displayed on the terminal screen to the second position displayed on the terminal screen. In addition, the second position is offset relative to the first position, so that the position of the controlled virtual object displayed on the terminal screen is different when located in a different region of the virtual scene. Correspondingly, the content of the virtual scene that the terminal user can observe is also different, so that the terminal user can obtain more scene information, thereby improving the efficiency of man-machine interaction.

Figure 12:
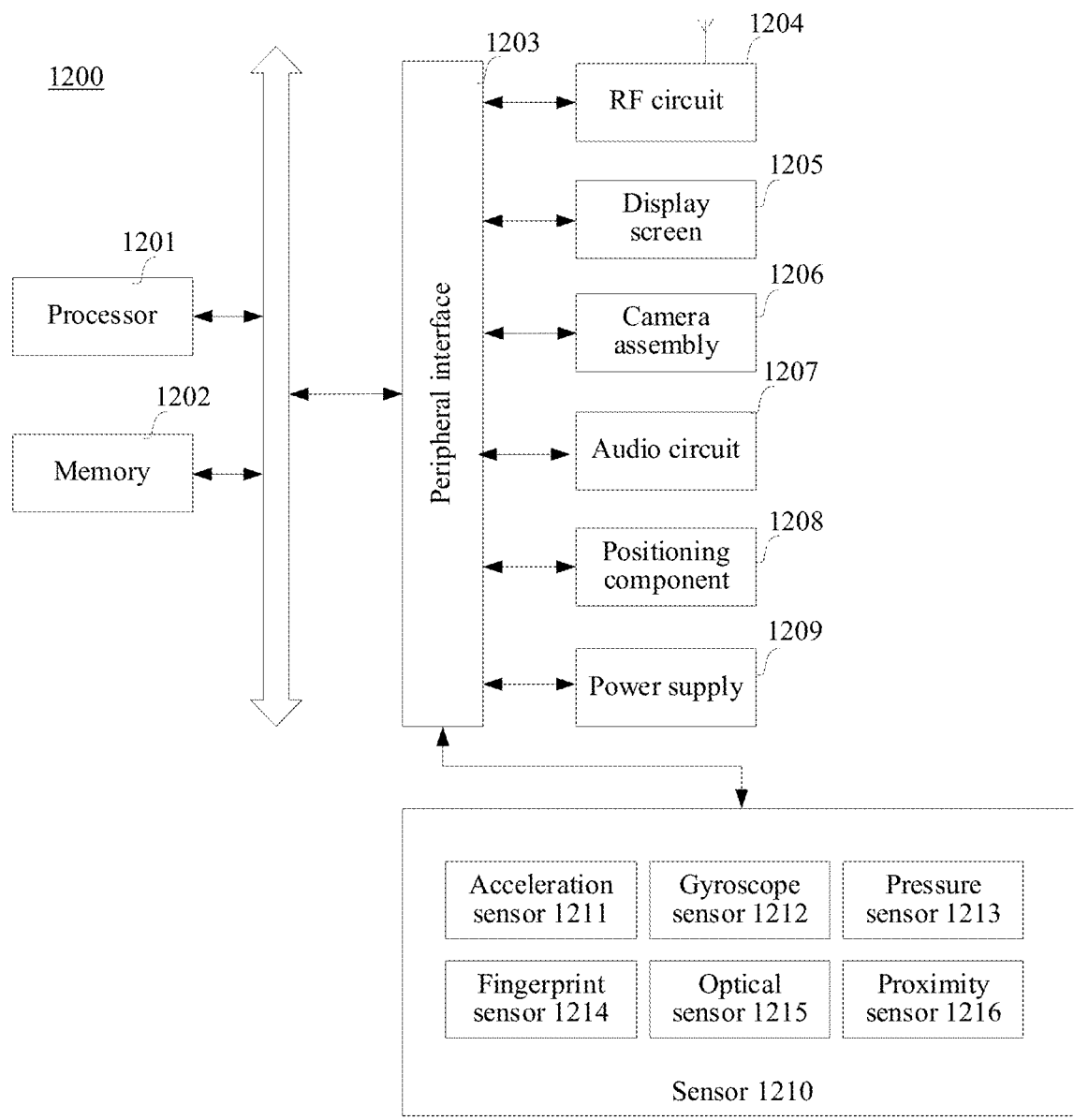
FIG. 12 is a schematic structural diagram of a terminal according to an embodiment of the disclosure.

FIG. 12 is a schematic structural diagram of a terminal according to an embodiment of the disclosure. The terminal 1200 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as other names such as user equipment, a portable terminal, a laptop terminal, or a desktop terminal.

Generally, the terminal 1200 includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In an example embodiment, the processor 1201 may be integrated with a graphics processing unit (GPU). The GPU is responsible for rendering and drawing content to be displayed by a display screen. In an example embodiment, the processor 1201 may further include an artificial intelligence (AI) processor. The AI processor is configured to process a calculation operation related to machine learning.

The memory 1202 may include one or more computer-readable storage media that may be non-transitory. The memory 1202 may further include a high-speed random access memory and a non-volatile memory, such as one or more magnetic disk storage devices or flash storage devices. In an example embodiment, the non-transient computer-readable storage medium in the memory 1202 is configured to store at least one instruction. The at least one instruction is executed by the processor 1201 to perform the method for displaying a virtual scene provided in the embodiments in this application.

In example embodiments, the terminal 1200 may optionally include: a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral device includes: at least one of a radio frequency (RF) circuit 1204, a touch display screen 1205, a camera assembly 1206, an audio circuit 1207, a positioning component 1208, and a power supply 1209.

The peripheral interface 1203 may be configured to connect the at least one peripheral related to input/output (I/O) to the processor 1201 and the memory 1202. In some embodiments, the processor 1201, the memory 1202, and the peripheral interface 1203 are integrated on the same chip or circuit board. In an example embodiment, any one or two of the processors 1201, the memory 1202, and the peripheral interface 1203 may be implemented on a separate chip or circuit board. This is not limited in this embodiment.

The RF circuit 1204 is configured to receive and transmit an RF signal, also referred to as an electromagnetic signal. The RF circuit 1204 communicates with a communication network and another communication device by using the electromagnetic signal. The RF circuit 1204 converts an electric signal into an electromagnetic signal for transmission, or converts a received electromagnetic signal into an electric signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In an example embodiment, the RF 1204 may further include a circuit related to near field communication (NFC), which is not limited in the disclosure.

The display screen 1205 is configured to display a UI. The UI may include a graph, a text, an icon, a video, and any combination thereof. When the display screen 1205 is the touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In an example embodiment, there may be one display screen 1205, disposed on a front panel of the terminal 1200. In example embodiments, there may be at least two display screens 1205, respectively disposed on different surfaces of the terminal 1200 or designed in a foldable shape. In example embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to capture an image or a video. Optionally, the camera component 1206 includes a front-facing camera and a rear-facing camera. Generally, the front-facing camera is disposed on a front panel of the terminal, and the rear-facing camera is disposed on a rear surface of the terminal. In example embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and VR shooting functions through fusion of the main camera and wide-angle camera, or another fusion shooting function. In an example embodiment, the camera assembly 1206 may further include a flash. The flash may be a single-color-temperature flash, or may be a double-color-temperature flash. The double-color-temperature flash refers to a combination of a warm-light flash and a cold-light flash, and may be used for light compensation under different color temperatures.

The audio circuit 1207 may include a microphone and a speaker. The microphone is configured to acquire sound waves of users and surroundings, and convert the sound waves into electrical signals and input the signals to the processor 1201 for processing, or input the signals to the RF circuit 1204 to implement voice communication. For the purpose of stereo acquisition or noise reduction, there may be a plurality of microphones, respectively disposed at different portions of the terminal 1200. The microphone may further be an array microphone or an omni-directional acquisition type microphone. The speaker is configured to convert electric signals from the processor 1201 or the RF circuit 1204 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In an example embodiment, the audio circuit 1207 may also include an earphone jack.

The positioning component 1208 is configured to position a current geographic location of the terminal 1200 for implementing navigation or a location-based service (LBS). The positioning component 1208 may be a positioning component based on the global positioning system (GPS) of the United States, the COMPASS System of China, the GLONASS System of Russia, or the GALILEO System of the European Union.

The power supply 1209 is configured to supply power to components in the terminal 1200. The power supply 1209 may be an alternating current, a direct current, a primary battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In an example embodiment, the terminal 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

A person skilled in the art may understand that the structure shown in FIG. 10 does not constitute a limitation to the terminal 1200, and the terminal may include more or fewer components than those shown in the figure, or some components may be combined, or a different component deployment may be used.

In an example embodiment, a computer-readable storage medium, for example, a memory including at least one program code is further provided. The at least one program code may be executed by a processor in a terminal to implement the method for displaying a virtual scene in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the operations of the foregoing embodiments may be implemented by hardware, or may be implemented by a program instructing relevant hardware. The program may be stored in a computer-readable storage medium. The storage medium may be a read-only memory, a magnetic disk, an optical disc, or the like.

The foregoing descriptions are merely example embodiments of the disclosure, but are not intended to limit the disclosure. Any modification, equivalent replacement, or improvement made within the spirit and principle of the disclosure shall fall within the protection scope of the disclosure.

What is claimed is:

1. A method for displaying a virtual scene, the method being performed by a terminal and comprising:
    displaying a virtual scene image on a terminal screen, the virtual scene image comprising a controlled virtual object in the virtual scene, the controlled virtual object being a virtual object currently controlled by the terminal,
        wherein a virtual camera lens anchor point is associated with a central position of the terminal screen,
        wherein the virtual scene is divided into a plurality of regions, and wherein a relative position of the virtual camera lens anchor point and the controlled virtual object is based on a location of the controlled virtual object among the plurality of regions;

displaying, in response to the controlled virtual object being located in a first region in the virtual scene, the controlled virtual object at a first position on the terminal screen, wherein the controlled virtual object is displayed in a center region of the terminal screen and the controlled virtual object is displayed at a first offset from the virtual camera lens anchor point; and displaying, in response to the controlled virtual object entering a second region in the virtual scene, the controlled virtual object at a second position on the terminal screen, wherein, based on the controlled virtual object being in the second region in the virtual scene, the controlled virtual object is not displayed in the center region of the terminal screen and the controlled virtual object is displayed at a second offset from the virtual camera lens anchor point.

2. The method according to claim 1, wherein controlling displaying the controlled virtual object at the second position on the terminal screen comprises:

obtaining a target offset corresponding to the second region in response to the controlled virtual object entering the second region in the virtual scene;

determining a second scene position according to the target offset and a first scene position of the controlled virtual object in the virtual scene; and controlling the virtual camera lens anchor point to move to the second scene position, so that the controlled virtual object is displayed at the second position on the terminal screen, the virtual camera lens anchor point being a scene position corresponding to the central position of the terminal screen in the virtual scene.

3. The method according to claim 2, wherein the first offset is zero, and wherein the determining comprises:

obtaining a sum of the target offset and the first scene position of the controlled virtual object in the virtual scene, and using the sum as the second scene position.

4. The method according to claim 2, wherein the controlling the virtual camera lens anchor point comprises:

obtaining movement configuration information, the movement configuration information being used for indicating a movement mode and a movement speed of moving the virtual scene image; and controlling, according to the movement mode and the movement speed indicated by the movement configuration information, the virtual camera lens anchor point to move to the second scene position.

5. The method according to claim 1, wherein before displaying the controlled virtual object the second position on the terminal screen, the method further comprises:

determining, in response to a movement operation of the controlled virtual object in the first region, a first scene position of the controlled virtual object after moving in the virtual scene;

obtaining a third region corresponding to the first scene position; and using the third region as the second region in response to the third region being different from the first region.

6. The method according to claim 5, wherein the obtaining comprises:

determining, according to the first scene position, a target grid where the first scene position is located, the target grid being any grid of a plurality of grids corresponding to the virtual scene; and obtaining a region corresponding to the target grid as the third region according to a correspondence between a grid identifier and a region identifier.

7. The method according to claim 6, wherein before determining the target grid where the first scene position is located, the method further comprises:

dividing the virtual scene into the plurality of grids, one region of the virtual scene being corresponding to at least one grid; and establishing the correspondence between the grid identifier of a respective grid and the region identifier of a respective region.

8. An apparatus for displaying a virtual scene, comprising:
a terminal screen;
at least one memory configured to store computer program code;
at least one processor configured to operate as instructed by the computer program code, the computer program code including:

first display code configured to cause the at least one processor to display a virtual scene image on the terminal screen, the virtual scene image comprising a controlled virtual object in the virtual scene, the controlled virtual object being a virtual object currently controlled by the terminal, wherein a virtual camera lens anchor point is associated with a central position of the terminal screen, wherein the virtual scene is divided into a plurality of regions, and wherein a relative position of the virtual camera lens anchor point and the controlled virtual object is based on a location of the controlled virtual object among the plurality of regions;

second display code configured to cause the at least one processor to display, in response to the controlled virtual object being located in a first region in the virtual scene, the controlled virtual object to be displayed at a first position on the terminal screen, wherein the controlled virtual object is displayed in a center region of the terminal screen and the controlled virtual object is displayed at a first offset from the virtual camera lens anchor point; and third display code configured to cause the at least one processor to display, in response to the controlled virtual object entering a second region in the virtual scene, the controlled virtual object at a second position on the terminal screen, wherein, based on the controlled virtual object being in the second region in the virtual scene, the controlled virtual object is not displayed in the center region of the terminal screen and the controlled virtual object is displayed at a second offset from the virtual camera lens anchor point.

9. The apparatus according to claim 8, wherein the third display code comprises:

obtaining code configured to cause the at least one processor to obtain a target offset corresponding to the second region in response to the controlled virtual object entering the second region in the virtual scene;

determining code configured to cause the at least one processor to determine a second scene position according to the target offset and a first scene position of the controlled virtual object in the virtual scene; and fourth display code configured to cause the at least one processor to control a virtual camera lens anchor point to move to the second scene position, so that the controlled virtual object is displayed at the second position on the terminal screen, the virtual camera lens anchor point being a scene position corresponding to the central position of the terminal screen in the virtual scene.

10. The apparatus according to claim 9, wherein the first offset is zero, and wherein the fourth determining code is configured to obtain a sum of the target offset and the first scene position of the controlled virtual object in the virtual scene, and use the sum as the second scene position.

11. The apparatus according to claim 9, wherein the fourth display code is configured to:
obtain movement configuration information, the movement configuration information being used for indicating a movement mode and a movement speed of moving the virtual scene image; and
control, according to the movement mode and the movement speed indicated by the movement configuration information, the lens virtual camera lens anchor point to move to the second scene position.

12. The apparatus according to claim 8, further comprising:
position determining code configured to cause the at least one processor to determine, in response to a movement operation of the controlled virtual object in the first region, a first scene position of the controlled virtual object after moving in the virtual scene; and
region obtaining code configured to cause the at least one processor to obtain a third region corresponding to the first scene position, and
the region obtaining code being further configured to use the third region as the second region in response to the third region being different from the first region.

13. The apparatus according to claim 12, wherein dividing the virtual scene into a plurality of regions comprises:
grid determining code configured to cause the at least one processor to determine, according to the first scene position, a target grid where the first scene position is located, the target grid being any grid of a plurality of grids corresponding to the virtual scene; and
second region obtaining code configured to cause the at least one processor to obtain a region corresponding to the target grid as the third region according to a correspondence between a grid identifier and a region identifier.

14. The apparatus according to claim 13, wherein before determining a target grid where the first scene position is located, the program code causes the at least one processor to:
divide the virtual scene into the plurality of grids, one region of the virtual scene corresponding to at least one grid; and
establish the correspondence between the grid identifier of a respective grid and the region identifier of a respective region.

15. A non-transitory computer readable storage medium, storing computer program code that when executed by at least one processor causes the at least one processor to:
display a virtual scene image on a terminal screen, the virtual scene image comprising a controlled virtual object in the virtual scene, the controlled virtual object being a virtual object currently controlled by the terminal,
wherein a virtual camera lens anchor point is associated with a central position of the terminal screen,
wherein the virtual scene is divided into a plurality of regions, and
wherein a relative position of the virtual camera lens anchor point and the controlled virtual object is based on a location of the controlled virtual object among the plurality of regions;
display, in response to the controlled virtual object being located in a first region in the virtual scene, the controlled virtual object at a first position on the terminal screen,
wherein the controlled virtual object is displayed in a center region of the terminal screen and the controlled virtual object is displayed at a first offset from the virtual camera lens anchor point; and
display, in response to the controlled virtual object entering a second region in the virtual scene, the controlled virtual object at a second position on the terminal screen,
wherein, based on the controlled virtual object being in the second region in the virtual scene, the controlled virtual object is not displayed in the center region of the terminal screen and the controlled virtual object is displayed at a second offset from the virtual camera lens anchor point.

16. The non-transitory computer-readable storage medium according to claim 15, wherein displaying the controlled virtual object at the second position on the terminal screen comprises:
obtaining a target offset corresponding to the second region in response to the controlled virtual object entering the second region in the virtual scene;
determining a second scene position according to the target offset and a first scene position of the controlled virtual object in the virtual scene; and
controlling a virtual camera lens anchor point to move to the second scene position, so that the controlled virtual object is displayed at the second position on the terminal screen, the virtual camera lens anchor point being a scene position corresponding to the central position of the terminal screen in the virtual scene.

17. The non-transitory computer-readable storage medium according to claim 16, wherein the first offset is zero, and wherein the determining comprises:
obtaining a sum of the target offset and the first scene position of the controlled virtual object in the virtual scene, and using the sum as the second scene position.

18. The non-transitory computer-readable storage medium according to claim 16, wherein the controlling a virtual camera lens anchor point to move to the second scene position comprises:
obtaining movement configuration information, the movement configuration information being used for indicating a movement mode and a movement speed of moving the virtual scene image; and
controlling, according to the movement mode and the movement speed indicated by the movement configuration information, the virtual camera lens anchor point to move to the second scene position.

19. The non-transitory computer-readable storage medium according to claim 15, wherein before controlling the controlled virtual object to be displayed at the second position on the terminal screen, the program code causes the at least one processor to:
  determine, in response to a movement operation of the controlled virtual object in the first region, a first scene position of the controlled virtual object after moving in the virtual scene;
  obtain a third region corresponding to the first scene position; and
  use the third region as the second region in response to the third region being different from the first region.

20. The non-transitory computer-readable storage medium according to claim 19, wherein obtaining a third region corresponding to the first scene position comprises:
  determining, according to the first scene position, a target grid where the first scene position is located, the target grid being any grid of a plurality of grids corresponding to the virtual scene; and
  obtaining a region corresponding to the target grid as the third region according to a correspondence between a grid identifier and a region identifier.

* * * * *